Feb. 15, 1966  M. GENNERICH ETAL  3,235,169
PLASTIC VALVE BAG
Filed April 8, 1963  4 Sheets-Sheet 1
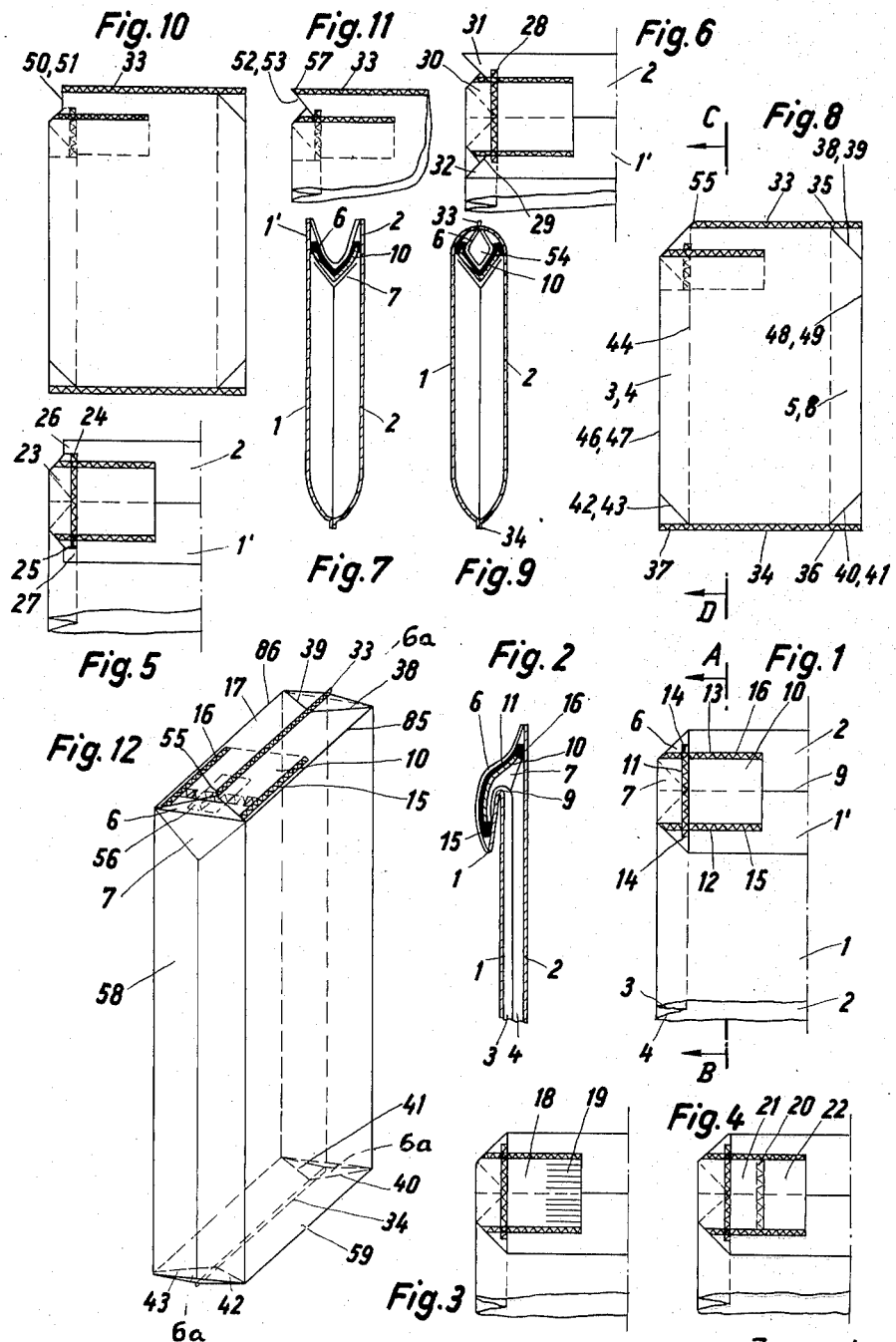
Inventors:
MAX GENNERICH, KURT ROCHLA
and KARL-HEINZ TRAUTMANN
by
Arthur O. Klein
their Attorney Feb. 15, 1966    M. GENNERICH ETAL    3,235,169
PLASTIC VALVE BAG
Filed April 8, 1963    4 Sheets-Sheet 2
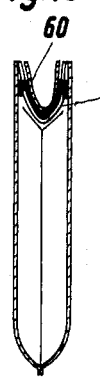
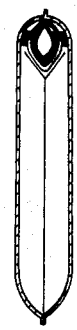
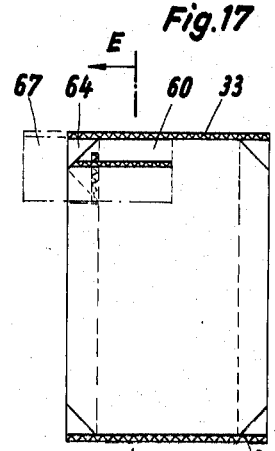
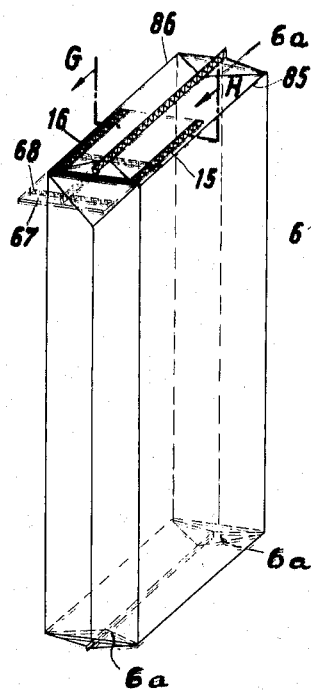
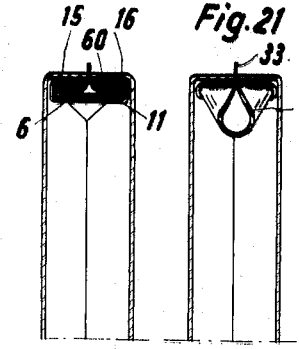
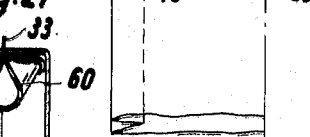
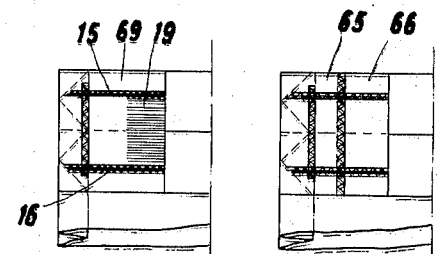
Inventors:
MAX GENNERICH, KURT ROCHLA
and KARL-HEINZ TRAUTMANN
by
Arthur O. Klein
their Attorney Feb. 15, 1966     M. GENNERICH ETAL     3,235,169
PLASTIC VALVE BAG
Filed April 8, 1963                                              4 Sheets-Sheet 3
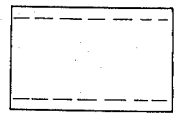
Fig. 22
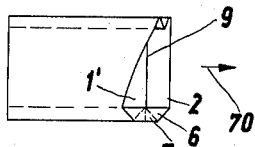
Fig. 23
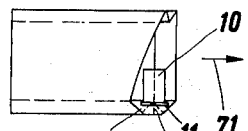
Fig. 24
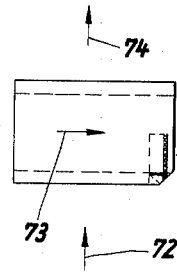
Fig. 27
Fig. 26
Fig. 25
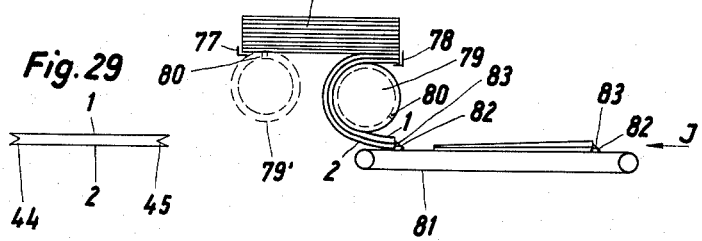
Fig. 28     Fig. 29
Inventors:
MAX GENNERICH, KURT ROCHLA
and KARL-HEINZ TRAUTMANN
by
Arthur O. Klein
their Attorney Inventors:
MAX GENNERICH, KURT ROCHLA
and KARL-HEINZ TRAUTMANN
by
Arthur O. Klein
their Attorney

United States Patent Office 3,235,169
Patented Feb. 15, 1966

3,235,169
PLASTIC VALVE BAG
Max Gennerich, Kurt Rochla, and Karl-Heinz Trautmann,
Lengerich, Westphalia, Germany, assignors to Windmöller & Hölscher, Westphalia, Germany
Filed Apr. 8, 1963, Ser. No. 271,162
Claims priority, application Germany, Apr. 9, 1962,
W 32,000; May 9, 1962, W 32,223
8 Claims. (Cl. 229—62.5)

This invention relates to the making of a plastic valve bag, which in the filled state assumes the form of a parallelepiped, as well as to a method and means for its manufacture.

A valve bag made of weldable material comprising gussets and ends each closed by a weld has already been disclosed. The filling valve of this bag is formed by folding in one corner, as has been customary for a long time in gusseted bags of paper which are sewn or glued at the ends. In the known valve bag of weldable material, the folded in part forming the valve opening, which—in a manner known from paper bag manufacture—can be extended and provided with a valve insert and/or a valve extension, is welded at its upper edge together with the closing weld of the bag. This construction has the disadvantage that the valve tube thus formed, when the bag is filled and has parallelepipedic form, hangs down in a pear shape into the inside of the bag from the weld located in the middle of the respective side of the parallelepiped and under the effect of the contents of the bag cannot be brought into a perfect and reliable closure position. As soon as the contents on a change in the bag position, no longer press firmly against the valve tube, the latter opens and no longer performs a sealing function. In this state dirt and moisture can penetrate the bag from outside and on tilting of the bag, the contents may come out of it. In particular, owing to the great deformability of plastic material in contradistinction to paper, the valve is undesirably forced out of the valve opening by the contents.

The inventors have set themselves the problem of remedying this state of affairs and propose for this purpose a plastic valve bag with gussets, ends each closed by a weld and a filling valve formed by a folded in bag corner and a welded in extension or insert strip, which is characterized by the feature that the folded in and extended part forming the valve channel is secured to the bag walls along the edges of the parallelepiped wall (formed on filling) running parallel with the valve channel, by a weld on each side. As a result, when the parallelepipedic form is being assumed on filling of the bag, the valve tube is pulled out and flattened, so that regardless of the position of the bag, it assumes a closing position and reliably prevents discharge from inside and penetration from outside. By fixing the valve on the bag walls, inverting of the valve by the contents is rendered impossible.

A further inventive proposal consists in that use is made of a valve extension strip that does not reach as far as the closing weld of the bag, but has only substantially the width of the base plus twice the width of the weld. In contradistinction to the known embodiment, this improves the valve whilst at the same time saving material.

A substantial part of the invention is constituted by the method of manufacturing the bag defined above. The inventors have set themselves the problem of evolving a method of manufacture, which can be carried out mechanically. In the pertinent art a method of manufacture which can be carried out mechanically has not yet been disclosed for the above mentioned known plastic valve bag.

Finally the invention relates to parts of a device for carrying the method into effect.

Various embodiments of the plastic valve bag according to the invention as well as the method and parts of the device for its manufacture are described in more detail hereunder with reference to the accompanying drawings, in which:

FIGURE 1 shows an embodiment of the plastic valve bag according to the invention in a preliminary stage of its manufacture.

FIGURE 2 is a section along the line A—B of FIGURE 1.

FIGURES 3 to 6 show modified embodiments of the plastic valve bag according to the invention in the same stage of manufacture as in FIGURE 1.

FIGURE 7 is a section substantially along the line C—D of FIGURE 8 through the plastic valve bag according to FIGURE 1 in the next stage of its manufacture.

FIGURE 8 shows the flat finished plastic valve bag according to FIGURES 1, 2 and 7.

FIGURE 9 is a section along the line C—D of FIGURE 8 with the bag walls slightly spread out.

FIGURE 10 shows the flat finished plastic valve bag in the embodiment according to FIGURE 5.

FIGURE 11 shows the valve corner of the finished flat plastic bag in the embodiment according to FIGURE 6.

FIGURE 12 shows the plastic valve bag according to FIGURES 1, 2, 7 and 8 in the filled parallelepipedic state.

FIGURE 13 shows a further embodiment of the plastic valve bag according to the invention in the state as in FIGURE 1.

FIGURES 14 and 15 show modified embodiments of the plastic valve bag according to FIGURE 13 in the same stage of manufacture.

FIGURE 16 is a section substantially along the line E—F of FIGURE 17 through a plastic valve bag according to FIGURE 13 in the next stage of manufacture.

FIGURE 17 shows the flat finished plastic valve bag according to FIGURE 13.

FIGURE 18 is a section along the line E—F of FIGURE 17 with the bag walls slightly spread out.

FIGURE 19 shows the plastic valve bag according to FIGURES 13, 16, 17 and 18 in the filled, parallelepipedic state.

FIGURE 20 shows the filled plastic valve bag according to FIGURE 19 in a section G—H through the valve channel.

FIGURE 21 shows a known plastic valve bag in the filled parallelepipedic state in a section through the valve tube hanging down in a pear shape.

FIGURES 22 to 27 show the method of manufacture according to the invention in its various stages.

FIGURE 28 shows the opening of the gusseted tubular sections in a diagrammatic side view.

FIGURE 29 is a view in the direction of the arrow J of FIGURE 28 of the opened end of a gusseted tubular section.

Figure 30:
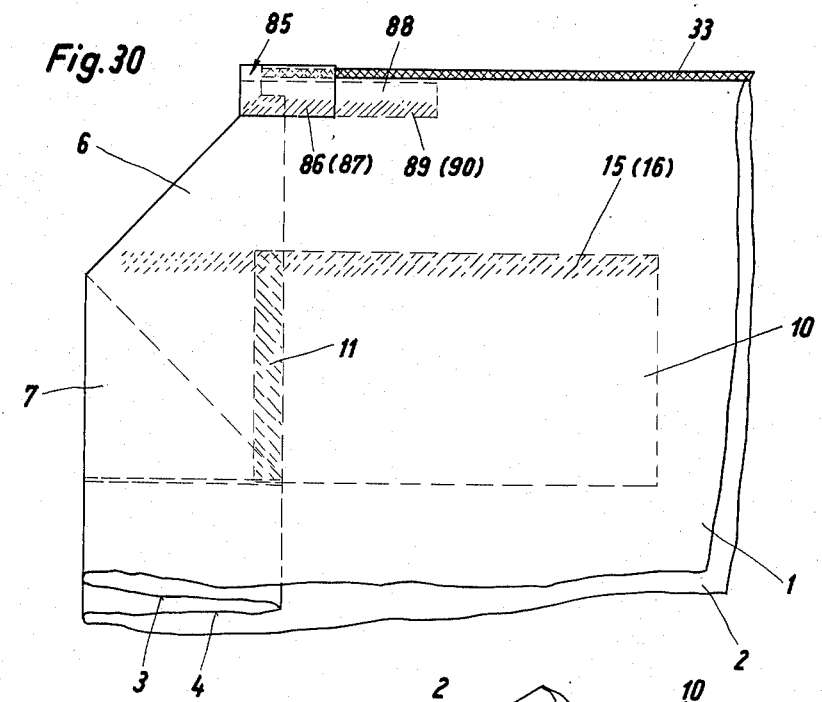
FIGURE 30 shows the valve corner of an empty plastic valve bag with gussets according to a further embodiment.

The construction of the first embodiment of the plastic valve bag according to the invention may best be understood if one considers a preliminary stage of its manufacture, as shown in FIGURES 1 to 6 in various embodiments. The bag according to the invention is made from a gusseted tubular section with the bag walls 1 and 2 and gussets inserted on both sides, as for example the gussets 3, 4. At the corner to be provided with the valve, the gusseted tubular section is, in a manner known per se, opened by folding back of a piece 1' of the upper tube wall 1 about a folding line 9, thus forming a corner fold 6 and a gusset triangle 7. Beneath the corner fold 6 (see FIG. 2) there is then pushed a valve strip 10 which is connected to the corner piece by a weld 11. The weld 11 projects beyond the side edges 12 and 13 of the valve strip 10 by pieces 14 for the sake of safety. It is however also sufficient if the weld 11 is as long as the valve strip 10 is wide. The width of the valve strip 10 should be at least so dimensioned that a weld 15, 16 can be made along both its longitudinal edges 12 and 13 on either side of the gusset triangle 7 in order to join the valve strip 10 to the folded back piece 1' of the bag side wall 1 and to the bag side wall 2. The width of the gusset triangle 7 determines the width of the top wall 17 of the parallelepiped (FIGURE 12) formed when the bag is filled, which side comprises the side edges 85 and 86 running parallel with the valve channel and along which run the welds 15 and 16. The welds 15 and 16 are extended beyond the weld 11 and on this extension join the corner fold 6 to bag top walls 1' and 2.

According to the embodiment shown in FIGURE 3, the valve strip 18, which is otherwise identical with the valve strip 10, is provided at its free end with fringe-forming incisions 19 in order to enhance the sealing effect of the valve strip.

According to the embodiment shown in FIGURE 4, the valve strip consists of two individual strips 21 and 22 joined together by a weld 20, the strip 22 of which consists of a particularly thin plastic material, in order to increase the sealing action as a result of the great flexibility thereby produced. In addition the thinner strip 22 may also be provided with fringe-forming incisions.

In the embodiment according to FIGURE 5, the corner fold 23 is cut at right angles to tis free edge at 24 and 25 in a manner known per se, whereby the free rectangular tips 26 and 27 extend the exposed portions of the bag walls 1' and 2 correspondingly.

In the embodiment according to FIGURE 6 the cuts 28 and 29 in the corner fold 30 are oblique, for example at 45°, the exposed portions of the bag walls 1' and 2 being extended by corresponding pointed tips 31 and 32, the purpose of which is indicated below.

After these preparations the folded back tube wall 1' is folded back again, thus commencing double folding of the valve strip 10, the corner fold and the gusset triangle 7, as shown in FIGURE 7, whereupon a complete flat folding is achieved as shown in FIGURES 8, 10 and 11, and the bag walls 1 and 2 are joined at both ends of the tubular section by a weld 33, 34, the gussets 3, 4 and 5, 8 being welded also within the welds 33 and 34 at the three corners 35, 36 and 37 which do not contain the filling valve forming part of this invention. After the welds 33 and 34 have formed the corners 35, 36 and 37 assume, when the bag is filled, a well known configuration of welded plastic bags, as for instance illustrated in FIG. 23 of U.S. Patent No. 3,004,698.

In addition the gusset faces 6a may be joined to the adjacent bag wall 1, 2 respectively by diagonal welds 38 to 43, which begin at the point of intersection of the gusset folds 44 and 45 with the welds 33 and 34 and lead at an angle of 45° to the side edges 46, 47 and 48, 49. It should be noted that whereas gusset faces 6a are merely extensions of the respective gussets 3, 4, 5, 8, the corner fold 6 extends transversely across the entire top wall width, taking thereby a trapezoidal shape when unfolded as illustrated in FIGS. 1, 3, 4, 13, 14, 15. The sides of the corner fold 6 are integral with the adjacent bag walls 1', 2. At this stage the embodiment according to FIGURE 5 gives a work-piece as shown in FIGURE 10 with edges 50, 51 running perpendicularly to the weld 33.

The embodiment according to FIGURE 6 gives at this stage a work-piece as shown in FIGURE 11, in which the edges 52, 53 run obliquely for example at 45°, to the weld 33. After the introduction of the filling pipe into the valve opening 54 formed in the front part by the corner fold 6 and shown in FIGURE 9, the front point 55 (FIGURE 8) of the weld is subjected to very great stress. The embodiment according to FIGURE 8 without cuts in the corner fold offers least security against tearing of the weld 33 at this point 55, as can be seen particularly from FIGURE 12. It is therefore also proposed that this part should be reinforced by a cover strip 56 shown in dotted lines in FIGURE 12, which is preferably welded on, leaving the corner fold 6 free. The cover strip 56 is made of strong plastic material and results in the case of the bag delivered in the flat state according to FIGURE 8 in the fact that the valve opening is easily opened, which is advantageous for gripping the bag in order to push it over the filling connection, as the worker can immediately get under the strip 56 with his finger. Further, the cover strip 56 can also be made from a differently coloured plastic, as a result of which the valve corner is easily visible even at a distance.

The risk of tearing is met in another way by the cuts 24, 25 and 28, 29. As the point 57 shown in FIGURE 11 is flexible, tearing of the weld 33 at this point is practically impossible. A similar, though not such a marked effect can be obtained with the vertically running edges 50, 51 shown in FIGURE 10 giving a better appearance and avoiding the projecting corner 57 (FIGURE 11).

FIGURE 12 shows the parallelepipedic bag formed after filling and particularly makes it clear that the valve strip 10 lies flat below the parallelepiped wall 17, so that the best possible valve action for sealing the bag contents from inside to outside and from outside to inside is given and bulging of the valve towards the outside is prevented. The valve strip 10 is fixed on both sides by the welds 15 and 16 and is stretched out parallel with the wall 17 flat beneath it. In the parallelepipedic state of the bag, the gusset triangle 7 together with the opened out gussets are located in the one side 58 formed by them. The diagonal welds 38 to 43 are likewise shown in FIGURE 12 as single or dotted lines only and are located, with gusset triangles partly bounded by them and forming themselves on assuming of the parallelepiped form in the sides 17 and 59.

The embodiment according to FIGURES 13 to 20 differs from the first embodiment in that as valve strip, a strip 60 is used, which is placed over the corner fold 6 and extended beyond the welds 15 and 16 as far as the edges 61 and 62 of the tube walls 1' and 2 and at least as far as the front edge 63 of the corner fold 6. On closing of the bag by the welds 33 and 34, the valve strip 60 is welded within the weld 33 and forms moreover at the valve corner an extension 64 (FIGURE 17). According to FIGURE 14 the valve strip 60 may again be provided between the welds 15 and 16 with fringe-forming incisions 19 and/or according to FIGURE 15 may consist of two strips 65 and 66 of different thickness.

According to a further inventive proposal the valve insert of FIGS. 4 or 15 may consist of a unitary sheet of material that is thinner at one end than on the other which is thinner at one end may also be made, the said sheet of material having received a suitable cross-section with a thicker and a thinner part during extrusion. The entire width of the extruded length then corresponds to the desired valve strip length. A further proposal consists in rolling a length of material, extruded with uniform thickness and having the same width as the valve strip, intermittently at intervals corresponding to the length of the valve strip over a suitable part of the length, preferably under heat, and obtaining the valve strips by cross cuts after each rolled part has been welded to the valve strip. In the first proposal the valve strips are obtained transversely with respect to the valve strip as illustrated in, FIG. 15, and in the second proposal longitudinally of the said valve strip.

As indicated in FIGURES 13, 17, 19 in dotted lines, the valve insert strip 60 may also be extended outwardly beyond the insert front edge 63 by a piece 67. After filling, the projecting end 67 can then be closed by a weld 68, so that a hermetically sealed valve is formed.

FIGURE 20 shows the cross section of the valve tube and indicates the extended course of the lower valve wall 60, 6 which is achieved through the welds 15 and 16. FIGURE 21 shows, in contrast to this, an embodiment, in which there are no welds 15 and 16. The inner end of the valve insert strip 60 hangs down in a pear shape from the weld 33 and does not assume a readily reliable closing position for the valve. The freely hanging valve is easily deformed and is inverted towards the outside by the contents. The welds 15 and 16 therefore constitute a substantial improvement of the valve as regards its effectiveness in closing the bag and retaining the desired closing form.

FIGURES 16 and 18 are easily understood without further explanation, as they constitute in the present embodiment the same states as do FIGURES 7 and 9 in the first embodiment.

In the present embodiment the gusset faces in the bag corners not containing the valve are preferably again joined to the bag walls by diagonal welds.

The manufacture according to the invention of the plastic valve bag according to the first embodiment is carried out as follows:

The gusseted tubular section according to FIGURE 22 open at both ends is folded up at one end in the corner to be formed into the valve, as shown in FIGURE 23, the corner fold 6 and the gusset triangle 7 being formed simultaneously with the folding back of the upper wall part 1' about the folding line 9 extending partly over the width of the workpiece. Then, as shown in FIGURE 24, the valve strip 10 is pushed under the corner fold 6 and secured thereto by the weld 11, a heat-insulating intermediate layer preventing the simultaneous welding of layers lying underneath. Then the tube wall part 1' is folded back again, thus folding the valve strip 10, the corner fold 6 and the gusset triangle 7, resulting in the form shown in FIGURE 25. With interposition of a heat-insulating layer during the folding together, the welds 15 and 16 are now produced on both tube walls with application of pressure and heat from above and below. The working steps described as shown in FIGURES 23, 24 and 25 are preferably carried out with the work-piece stationary. Between the carrying out of the various working steps, the work-pieces are moved in the direction of the arrows 70, 71 from one working station to the next in the longitudinal direction of the tube. After carrying out the working steps according to FIGURE 25, the work-pieces are then moved transversely to their longitudinal direction in the direction of the arrow 72 to the next working station, because the heat-insulating layer interposed during folding together of the tube walls at the station of FIG. 25 does not then need to be swung out; instead the work-piece as it is moved in the direction of arrow 72 is stripped from the stationary heat-insulating layer. After reaching the working position according to FIGURE 26, the work-piece is moved in the direction of arrow 73 into the exact welding position and the weld 33 is produced. The work-piece is then moved in the direction of the arrow 74 into the next working position according to FIGURE 27 and is shifted in the direction of arrow 75 into the exact welding position for producing the weld 34. The plastic valve bag is thus substantially finished. The producing of the corner welding by the diagonal welds 38 to 43 then takes place, if necessary, in a further working position.

The preliminary opening of the forward end of the gusseted tubular section takes place, according to a further inventive proposal, directly after the separation of gusseted tubular sections from the underside of a stack of work-pieces 76 (FIGURE 28). The stack 76 of work-pieces supported in a known manner at the front and back by means of two angle ledges 77, 78, rests substantially on a roller 79 and supporting rolls of smaller diameter, not shown, arranged in front of and behind in its direction movement, which are so mounted and driven, that as they rotate below the stack they roll without friction alternately backwards and forwards being displaced simultaneously by the same amount. In the position 79' shown in dotted lines, the front end of the lowermost gusseted tubular section is gripped by means of suction openings 80 in the roller periphery and the work-piece is wound onto the roller as the latter moves back and simultaneously rotates. On being withdrawn over the angle ledge 77, which might also be replaced by individual sprung angle pieces arranged at intervals next to one another, the lower tube wall 1 is the first to be pulled over the angular parts and is thus separated from the upper tube wall 2, the tube end thus being stripped open. Particularly at the gusset folds 44, 45 (FIGURE 29) the tube walls 1 and 2 never actually adhere to one another, so that a progressive separation of both tube walls from one another can be obtained from these points. On reaching the lowest position of the suction openings 80, the tube wall 1 is still retained and the tube wall 2 hangs down to a considerable extent with the gussets opening, so that in this position grippers 82 secured to rotating chains 81, for example, can be pivoted into the open end of the tube, in order to grip the tube wall 2 now located at the bottom at its front edge and to take over further transport, after switching off of the suction air, of the tubular sections to the working positions illustrated in FIGURES 23 to 25. Raised fingers 83 arranged on the grippers 82 prevent falling down of the tube wall 1, so that the tubular sections reach the working station 23 with the front end already opened in order to be able to introduce the folding tools in a suitable manner.

In order to avoid tearing of the upper closing weld at its end nearest the valve, which is particularly subject to stress when the bag is filled, this end of the closing weld is, according to a further feature of the invention (see FIGURE 12) covered by a cover strip 56 welded at both sides of the weld. This cover strip offers the further advantage, that through the elasticity inherent therein, the valve opening of the bag delivered in the flat state can be opened more easily or automatically opens when a bag is withdrawn from a stack, so that the bag can easily be pushed onto a filling connection. The disadvantage of this construction has proved to be the welding on of a single cover strip, regardless of whether it is welded on the outer or inner surface of the part of the bag forming the base, because it may easily peel off in the case of undesirable impact with the filling connection when the empty bag is pushed on quickly.

The purpose of the invention is further to avoid with certainty the risk of peeling off of the cover strip.

Figure 31:
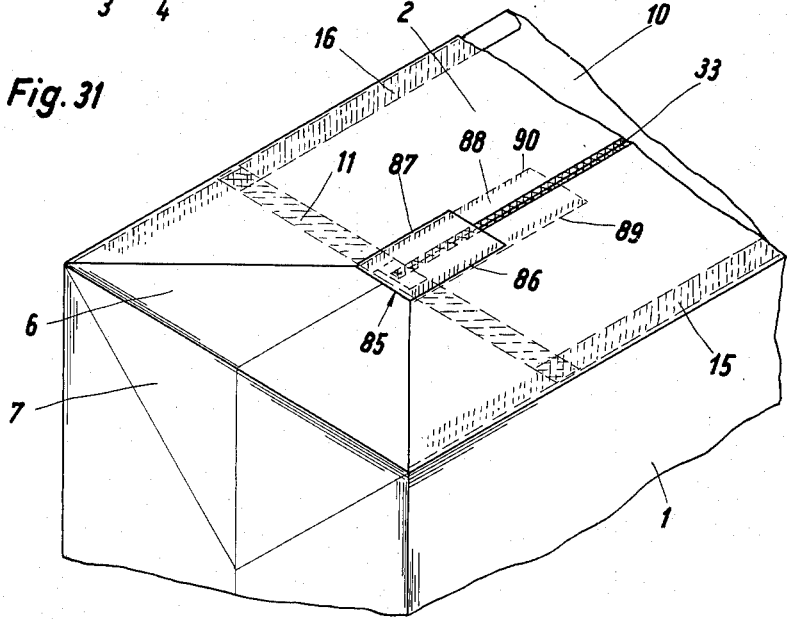
FIGURE 31 shows the valve corner of the same bag when filled.

This has been achieved according to the invention by the fact that the cover strip embraces with a bent back end the front edge of the bag walls connected by the closing weld and that the bent back end of the cover strip is welded to the bag walls at least at its longitudinal edges. This construction is shown in FIGURES 30 and 31. The plastic valve bag, of which only the valve corner is shown in the drawing, is made from a gusseted tubular section comprising the bag walls 1 and 2 and gussets inserted on both sides, of which only the one on one side has been shown and is designated 3, 4. By folding back the corner piece in the region of the gussets a corner fold 6 and a gusset triangle 7 are formed. Below the corner fold 6 is pushed a valve strip 10 which is connected thereto by a weld 11. The depth of the gussets which determines the width of the base of the filled bag, thus also determines substantially the width of the valve strip 10 and hence the position of the welds 15 and 16 on both longitudinal edges of the valve strip projecting beyond the base width. The welds 15 and 16 are extended beyond the weld 11 and on this extension connect the corner fold 6 with the bag walls 1 and 2.

The bag walls 1 and 2 are connected to one another at their upper end by a weld 33. In order to avoid tearing of the weld 33 at the end nearest the valve, this end is covered by a cover strip 85.

The cover strip 85 is welded to the bag walls 1 and 2, for example to the outer surface thereof, by means of welds 86, 87 on either side of the weld 33. With an end 88 bent back onto the inner surface, the cover strip encloses the edge of the bag walls 1 and 2 joined to one another by the closing welds 33.

This bent back end of the cover strip is welded at its longitudinal edges to the bag walls 1, 2 by means of welds 89, 90.

In the embodiment described the bent back end 88 of the cover strip 85 is the longer end. It is however just as possible to make the bent back end the same length as or shorter than the end of the cover strip welded by means of the welds 86, 87.

What we claim is:

1. A plastic bag, comprising two pairs of oppositely facing side walls, a first pair (58, 7, 3, 4, 5, 8) of said two pairs of side walls having a construction and shape adapted to form oppositely facing gussets (3, 4, 5, 8) in said side walls when said first pair of side walls is folded flatly, a first pair of gusset bottom wall extensions (6a) respectively integral with opposite sides of said first pair of side walls and extending towards each other, a second pair of bottom wall extensions respectively integral with said other pair of side walls (1, 2) extending towards each other and over said first pair of gusset bottom wall extensions (6a), a first welded seam (34) sealing said first and second pair of bottom wall extensions thereby forming a closed bottom wall (59) in said plastic bag when the latter is full, a top wall extension (6a) integral with one side of said first pair of side walls and extending toward the other wall of said first pair of side walls, a trapezoidally shaped corner portion (6) integral with said other wall of said first pair of side walls, said corner portion being adapted to be folded flatly, a rectangularly shaped valve strip (69) overlying said corner portion (6), said valve strip (69) including a plurality of grooves (19) at the end opposite the side adjacent to one gusset side wall (58, 7) of said two pairs of side walls, first welding means (11) connecting said corner portion (6) to the corresponding overlying valve strip (60), a pair of top wall extensions (1', 2) respectively integral with opposite sides (1, 2) of said other pair of side walls and with said corner portion (6) and extending toward each other and partially extending over said top wall extension (6a) said corner portion (6) and said valve strip (60), second welding means (15, 16) substantially transverse to said first welding means (11), connecting said valve strip to said pair of top wall extensions (1', 2) and a second welded seam (33) sealing said top wall extensions (1', 2, 6a) and opposite sides of said valve strip (60) thereby forming a top wall in said plastic bag when the latter is full, said valve strip (60) and second welded seam (33) defining a valve inlet for filling said plastic bag.

2. A plastic bag, comprising in combination, sidewall means (3, 4, 1, 2, 7, 5, 8), a top wall means (1', 2, 6) and bottom wall means respectively integral with said sidewall means on the top and bottom thereof, said bag having a construction and shape adapted to be folded flatly so that at least two oppositely facing sides (3, 4, 5, 8) of said sidewall means form oppositely facing gussets (3, 4, 5, 8), first welding means along said bottom sealing said bottom wall means, a valve strip (10) welded to at least a first trapezoidally shaped portion (6) of said top wall means adjacent to and integral with at least a portion of said sidewall means (7), a second portion of said top wall means (1', 2) extending over said valve strip, said first and second portion of said top wall means being integral with each other, second welding means (15, 16) connecting said valve strip (10) to said second portion of said top wall means (1', 2), a welded seam (33) sealing said second portion of said top wall means (1', 2) over said valve strip, a second valve strip (85, 88) extending over and under said welded seam (33), and third welding means (86, 87, 89, 90) securing said second valve strip (85, 88) to said second portion of said top wall means (1', 2) respectively at the top and underside thereof, said valve strip and said top wall means defining an inlet (54) therebetween for filling said plastic bag.

3. The plastic bag as defined in claim 2, wherein said second valve strip (85, 88) has a U-shape.

4. The plastic bag as defined in claim 2, wherein said strip (10) has substantially the width of said second portion of said top wall means (1', 2) plus twice the width of said second welding means (15, 16).

5. The plastic bag as defined in claim 2, wherein said second valve strip (85, 88) has a color pronouncedly different than the remainder of the bag.

6. A plastic bag, comprising two pairs of oppositely facing side walls, a first pair (58, 7, 3, 4, 5, 8) of said two pairs of side walls having a construction and shape adapted to form oppositely facing gussets (3, 4, 5, 8) in said side walls when said first pair of side walls is folded flatly, a first pair of gusset bottom wall extensions (6a) respectively integral with opposite side of said first pair of side walls and extending towards each other, a second pair of bottom wall extensions respectively integral with said other pair of side walls (1, 2) extending toward each other and over said first pair of gusset bottom wall extensions (6a), a first welded seam (34) sealing said first and second pair of bottom wall extensions thereby forming a closed bottom wall (59) in said plastic bag when the latter is full, a top wall extension (6a) integral with one side of said first pair of side walls and extending toward the other wall of said first pair of side walls, a trapezoidally shaped corner portion (6) integral with said other wall of said first pair of side walls, said corner portion being adapted to be folded flatly, a rectangularly shaped valve strip overlying said corner portion (6), said valve strip comprising a thicker section (65) and a thinner section (66), first welding means (11) connecting said corner portion (6) to the corresponding overlying valve strip (60), a pair of top wall extensions (1', 2) respectively integral with opposite sides (1, 2) of said other pair of side walls and with said corner portion (6) and extending toward each other and partially extending over said top wall extension (6a) said corner portion (6) and said valve strip (60), second welding means (15, 16) substantially transverse to said first welding means (11), connecting said valve strip to said pair of top wall extensions (1', 2) and a second welded seam (33) sealing said top wall extensions (1', 2, 6a) and opposite sides of said valve strip (60) thereby forming a top wall in said plastic bag when the latter is full, said valve strip (60) and second welded seam (33) defining a valve inlet for filling said plastic bag.

7. The plastic bag as defined in claim 6, including third welding means substantially parallel to said first welding means (11) connecting said valve strip (65, 66) to said second pair of top wall extensions (1', 2) along a line separating said thicker section (65) from said thinner section (66), said third welding means at least extending across the combined width of said second pair of top wall extensions (1', 2).

8. A plastic bag, comprising two pairs of oppositely facing side walls, a first pair of said two pairs of side walls having a construction and shape adapted to form oppositely facing gussets in said side walls when said first pair of side walls is folded flatly; a first pair of gusset bottom wall extensions respectively integral with opposite sides of said first pair of side walls and extending towards each other; a second pair of bottom wall extensions respectively integral with said other pair of side walls extending toward each other and over said first pair of gusset bottom wall extensions; a first welded seam connecting said first and second pair of bottom wall extensions; at least one pair of first diagonal welding seams further connecting said first and second pairs of bottom wall extensions, said first welded seam and said pair of first diagonal seams forming with said first and second pairs of bottom wall extensions a closed bottom wall in said plastic bag when the latter is full; a top wall extension integral with one side of said first pair of sidewalls and extending toward the other wall of said first pair of side walls; a trapezoidally shaped corner portion integral with said other wall of said first pair of side walls, said corner portion being adapted to be folded flatly; a rectangularly shaped valve strip overlying said corner portion; first welding means connecting said corner portion to the corresponding overlying valve strip; a pair of top wall extensions respectively integral with opposite sides of said other pair of side walls and with said corner portion and extending toward each other and partially extending over said top wall extension, said corner portion and said valve strip; second welding means, substantially transverse to said first welding means, connecting said valve strip to said pair of top wall extensions; a second welded seam sealing said top wall extensions and opposite sides of said valve strip thereby forming a top wall in said plastic bag when the latter is full, said valve strip and said second welded seam defining a valve inlet for filling said plastic bag; and at least one pair of second diagonal welding seams connecting said top wall extension to said pair of top wall extensions.

References Cited by the Examiner

UNITED STATES PATENTS

| | | | |
|---|---|---|---|
| 2,275,505 | 3/1942 | Crawford | 229—62.5 |
| 2,378,285 | 6/1945 | Contryman | 229—62.5 |
| 2,968,432 | 1/1961 | Craighead | 229—62.5 |
| 3,004,698 | 10/1961 | Ashton | 229—62.5 |
| 3,087,670 | 4/1963 | Rhodes | 229—62.5 |
| 3,095,023 | 6/1963 | Rang | 229—62.5 X |
| 3,102,676 | 9/1963 | Danelli et al. | 229—62.5 |
| 3,124,297 | 3/1964 | Vergobbi | 229—48 |
| 3,129,871 | 4/1964 | Becker | 229—62.5 |
| 3,143,936 | 8/1964 | Becker | 93—35 |

FOREIGN PATENTS 969,586    6/1958    Germany.

GEORGE O. RALSTON, *Primary Examiner.*